March 27, 1951      J. H. BURNSIDE      2,546,664
TRAILER HITCH

Filed Feb. 5, 1947      2 Sheets-Sheet 1

INVENTOR.
James H. Burnside
BY Henry G. Dybvig
His Attorney

March 27, 1951 J. H. BURNSIDE 2,546,664
TRAILER HITCH
Filed Feb. 5, 1947 2 Sheets-Sheet 2

INVENTOR.
James H. Burnside
BY Henry G. Dyboig
His Attorney

Patented Mar. 27, 1951

2,546,664

UNITED STATES PATENT OFFICE 2,546,664

TRAILER HITCH

James H. Burnside, Englewood, Ohio

Application February 5, 1947, Serial No. 726,702

6 Claims. (Cl. 280—33.44)

This invention relates to a hitch and more particularly to a hitch for connecting a trailer to a motor vehicle, although not necessarily so limited.

An object of this invention is to provide a trailer hitch for use in connecting a trailer to a motor vehicle, wherein a portion of the hitch is connected to the motor vehicle and another portion connected to the trailer, the portion of the hitch connected to the motor vehicle being divisible, so that one part may be removed to thereby eliminate the objectionable appearance of trailer hitches.

Another object of this invention is to provide a trailer hitch of the ball and socket type for a motor vehicle, wherein the portion of the hitch supporting the ball may be detached and when attached may be locked in position so as to prevent the removable parts from becoming disengaged while in use.

Another object of this invention is to provide a trailer hitch of the ball and socket type for use on a motor vehicle, wherein the trailer hitch has a portion fixedly attached to the chassis of the motor vehicle and a second portion removably attached to the fixedly attached portion, so that the ball and the parts associated therewith may be removed to eliminate the objectionable appearance when the trailer hitch is not in use.

Other objects and advantages reside in the construction of parts, the combination thereof and the mode of operation, as will become more apparent from the following description.

In the drawings, Figure 1 is a perspective view of a trailer hitch that is applied to the rear end of an automobile, having parts broken away.

Figure 1:
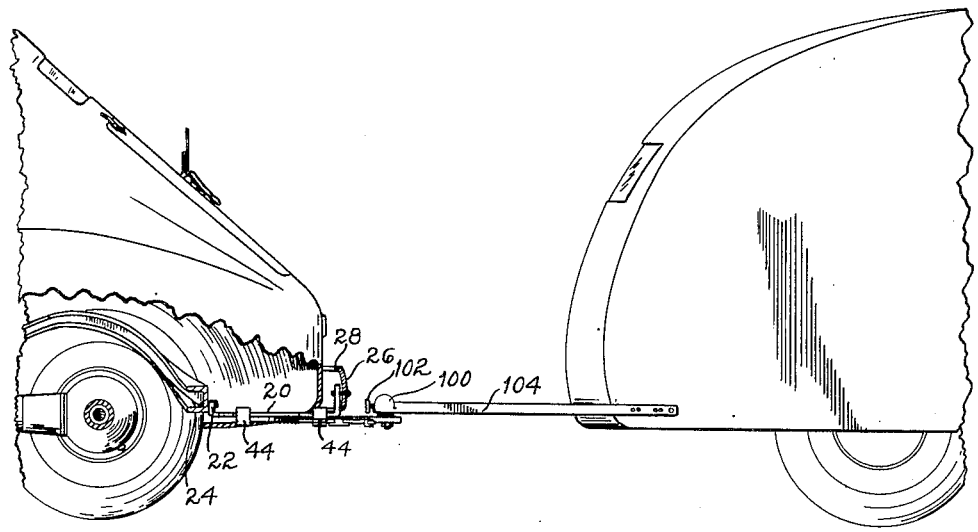
Figure 6:
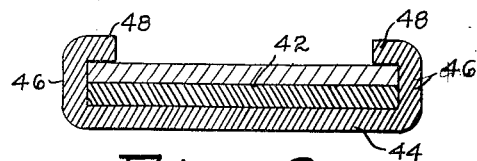
Figure 6 is a cross sectional view taken substantially on the line 6—6 of Figure 3.
Figure 7:
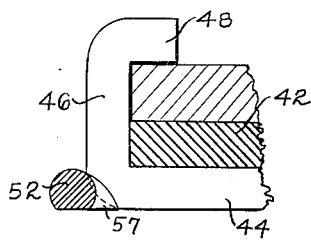
Figure 7 is a cross sectional view taken substantially on the line 7—7 of Figure 2.
Figure 4:
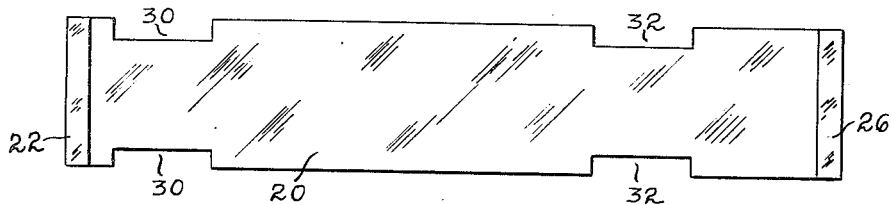
Figure 4 is a top plan view of the bracket permanently attached to the motor vehicle.
Figure 5:
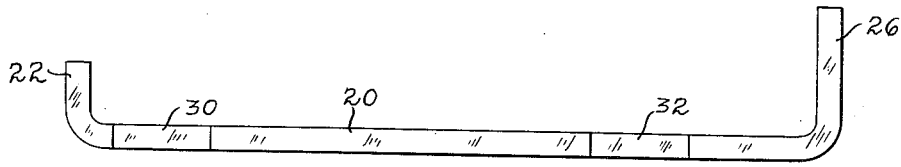
Figure 5 is a side elevational view thereof.

Referring to the drawings, the reference character 20 indicates a bar of metal provided with a flange 22 secured to a cross member 24 of an automobile, the cross member 24 being a portion of the frame of the automobile. Member 20 is also provided with a flange 26 secured to the inner side of the rear bumper 28, as best seen in Figure 1. As may best be seen by referring to Figures 4 and 5, the metallic bar 20 is provided with two pairs of laterally disposed notches 30 and 32. The bar 20 is permanently attached to the automobile in an inconspicuous manner. Member 20 might be referred to as a draw bar. This draw bar, instead of being bolted to the frame and the bumper of the motor vehicle, may be riveted, welded or otherwise secured in position.

The ball 40, functioning as one of the coupling units of a ball and socket type hitch, is attached to a bar 42, having fixedly attached thereto a pair of C-clamps 44. The two C-clamps 44 are identical and are preferably welded to the bar 42. Each of these clamps includes a pair of side flanges 46 and reentrant flange portions 48. The width of the flanges 46 corresponds to or is less than the width of the notches 30, and the length of the reentrant flange portions 48 is less than the depth of the notches 32. The flange portions 48 are arranged in spaced relation from the bar 42 a distance equal to or slightly greater than the thickness of the bar 20. By this arrangement, it may readily be seen that the bar 42, having attached thereto the ball 40, may be removably attached to the draw bar 20 by projecting the flange portions 48 upwardly through the notches 30 and the draw bar 20. After the flange portions 48 have been projected through the notches 30, the bar 42 may be drawn rearwardly, as clearly shown in the dotted relation of the draw bar 20 shown in Figures 2 and 3. The bar 42 may be locked in fixed position with respect to the bar 20 by a locking mechanism which will now be described.

Figure 11:
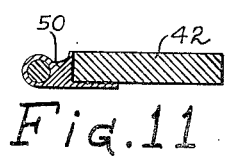
Figure 11 is a fragmentary, cross sectional view taken substantially on the line 11—11 of Figure 3.

The bar 42 supports a pair of bearing members 50, welded or otherwise secured to the bar 42, as best seen in Figure 11. The bearings 50 cooperate to support a rotatably mounted rod or shaft 52, having welded thereto a pawl member 54 provided with a flange portion 56. A cam sector 57, either integral with or welded to the shaft 52, engages the adjacent portion of the C-clamp 44 when the trailer hitch is locked.

Figure 8:
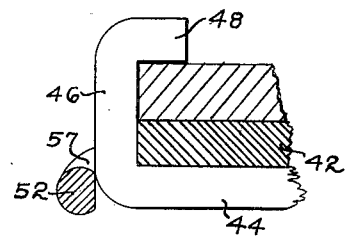
Figure 8 is a cross sectional view similar to Figure 7, wherein the parts have been adjusted into another position.
Figure 9:
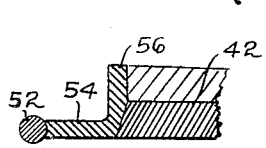
Figure 9 is a fragmentary, cross sectional view taken substantially on the line 9—9 of Figure 2.
Figure 10:
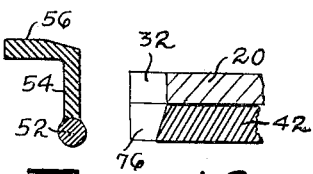
Figure 10 is a cross sectional view taken substantially on the line 10—10 of Figure 3.
Figure 2:
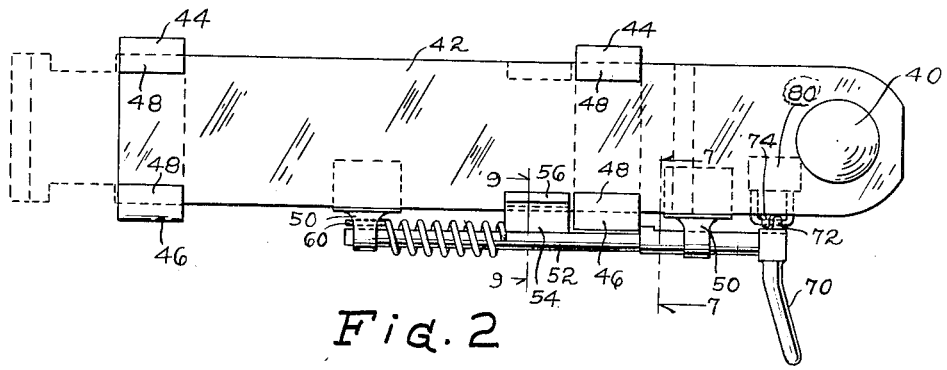
Figure 2 is a top plan view of the portion that is removable from the motor vehicle.
Figure 3:
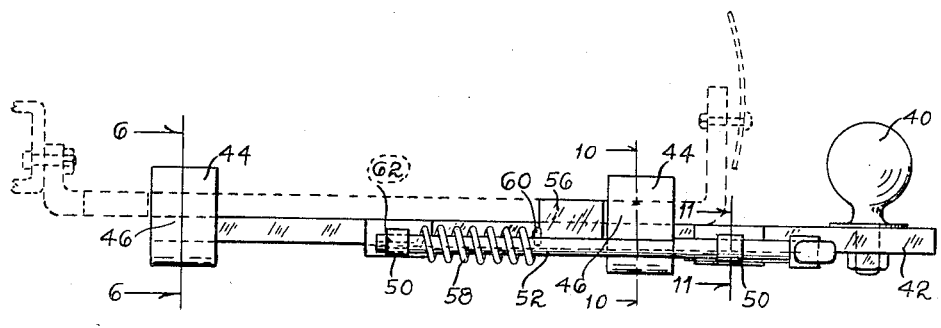
Figure 3 is a side elevational view thereof.

A helical spring 58 has one end 60 projecting into a suitable aperture in the shaft 52 and the opposite end 62 mounted in engagement with one of the bearings 50, urging the rod 52 in a clockwise direction, as viewed from the rear of the motor vehicle, or the right of Figures 2 and 3. The helical spring 58 is placed in tension, so that when the rod 52 is rotated into the position shown in Figure 8, the cam sector 57 is actuated into engagement with the adjacent C-clamp 44, so as to hold the pawl 54 out of engagement with the notch, to permit removal of the parts without interference from the pawl member 54.

This rod 52 also has fixedly attached thereto a handle 70 provided with an extension 72, having an eye registering with a corresponding eye in a lug 74 fixedly attached to the bar 42 when the bar holds the pawl member 54 in locking position. The pawl member 54 and the flange portion 56 when in locking position are seated in the notch 32 and a notch 76 in the bar 42, so as to lock the bar 42 with respect to the bar 20.

In order to provide for safety, a padlock 80 is used in locking the handle 70 in a non-rotatable position with respect to the bar 42, thereby locking the rod 52 and the pawl member 54 in position. This prevents accidental displacement of the parts and it also prevents the unauthorized removal of the portion of the hitch that is removably attached to the motor vehicle.

The socket 100 used in engaging the ball 40, lock mechanism 102 and the bar or bars 104 are not described in detail, for the reason that these parts may be any conventional hitch socket now appearing on the market and do not form per se a part of this invention.

It may be readily seen from the foregoing description that a rigid hitch connection attached to the frame of the automobile or other motor vehicle, as the case may be, has removably attached thereto means for supporting the ball. The ball, forming a portion of the trailer hitch, presents an objectionable appearance, especially when it is attached to a passenger automobile. By the arrangement shown herein, the ball and parts associated therewith may be removed when the trailer hitch is not used. The trailer hitch may be easily mounted in position in readiness for use whenever it is found desirable to tow a trailer.

In the claims, "automobile" is used illustratively of any motor vehicle and "trailer" is used to designate any vehicle or implement towed by the motor vehicle.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A trailer hitch of the ball and socket type for use in towing a trailer by an automobile having a frame and a bumper, said trailer hitch including a draw bar having notches therein, said draw bar being fixedly and permanently attached between the frame and the bumper, means including a ball removably attached to the draw bar, said means including a bar having C-clamps adapted to be projected through the notches in the draw bar and subsequently offset from the notches so as to provide an interconnection between said means and the draw bar.

2. A trailer hitch of the ball and socket type for use in towing a trailer by an automobile having a frame and a bumper, said trailer hitch including a notched draw bar projecting underneath the body of the automobile, said draw bar being fixedly and permanently attached between the frame and the bumper, and means including a second bar provided with clamps adapted to pass through the notches and subsequently offset from the notches for removably attaching the draw bar underneath the automobile, said means including a ball.

3. A trailer hitch of the ball and socket type for use in towing a trailer by an automobile having a frame and a bumper, said trailer hitch including a draw bar having a plurality of notches, said draw bar being fixedly and permanently attached between the frame and the bumper, means including a second bar mounted underneath and parallel to the draw bar, said means having flanges terminating in reentrant flange portions adapted to be projected through the notches in the first bar, said reentrant flanges being subsequently offset from the notches to hold the bars together, a ball fixedly attached to the second bar, and locking mechanism for locking said means to the draw bar.

4. A trailer hitch of the ball and socket type for use in towing a trailer by an automobile having a frame and a bumper, said trailer hitch including a draw bar having laterally disposed notches, said draw bar being fixedly and permanently attached between the frame and the concave side of the bumper, means removably attached to the draw bar, said means including a second bar mounted underneath and parallel to the draw bar, said means including lateral flanges fixedly attached to the second bar, said flanges terminating in reentrant flange portions adapted to be projected through the notches when attaching the second bar to the first bar, said reentrant flanges being offset from the notches when the second bar is attached to the first bar, a ball fixedly attached to the second bar, and locking mechanism for locking said means to the draw bar, said locking mechanism including a cam sector projecting into one of the notches in the draw bar.

5. A trailer hitch of the ball and socket type having a ball member releasably attached to a socket member for use in towing a trailer by an automobile having a frame and a bumper, said hitch including a notched draw bar having one end attached to the frame of the automobile and the other end attached to the concave side of the bumper, means removably attached to the draw bar, said means including a second bar mounted underneath and parallel to the draw bar, said means including a clamping member adapted to be inserted upon the notched draw bar to clamp the second bar to the first bar, a cam sector adapted to engage the notched draw bar to lock the second bar thereto, said means having one of said ball and socket members attached thereto, and means including the other of said ball and socket members attached to the trailer.

6. A trailer hitch of the ball and socket type having a ball member releasably attached to a socket member for use in towing a trailer by an automobile having a frame and a bumper, said hitch including a draw bar having one end attached to the frame of the automobile and the other end attached to the concave side of the bumper, said draw bar having a plurality of laterally disposed notches, means including a second bar mounted underneath and parallel to the draw bar, and a C-clamp attached to the second bar and adapted to be projected through the notches and subsequently offset from the notches to removably secure the second bar to the first bar, said means including one of said ball and socket members, locking mechanism for locking said means upon the draw bar, said locking mechanism including a cam sector seated in one of said notches, and means including the other of said ball and socket members attached to the trailer.

JAMES H. BURNSIDE.

REFERENCES CITED

The following references are of record in the file of this patent:

UNITED STATES PATENTS

| Number | Name | Date |
|---|---|---|
| 2,097,006 | Weis | Oct. 26, 1937 |
| 2,238,095 | Almcrantz | Apr. 15, 1941 |
| 2,309,850 | Klawitter | Feb. 2, 1943 |
| 2,372,271 | Heit | Mar. 27, 1945 |